United States Patent [19]

Choma et al.

[11] Patent Number: 5,253,773
[45] Date of Patent: Oct. 19, 1993

[54] FILLER TUBE FOR LIQUID CONTAINERS

[75] Inventors: Kevin R. Choma, Canton; Jack L. Boldt, Jr., Waterford, both of Mich.

[73] Assignee: General Signal Corporation, Stamford, Conn.

[21] Appl. No.: 935,542

[22] Filed: Aug. 26, 1992

[51] Int. Cl.⁵ ............................................. F16L 13/14
[52] U.S. Cl. .................................. 230/86.2; 285/202; 285/204; 285/222
[58] Field of Search ............... 220/86.2, 465, 661, 220/601; 285/162, 202, 204, 222

[56] References Cited

U.S. PATENT DOCUMENTS

| | | | |
|---|---|---|---|
| 1,875,908 | 9/1932 | Zarobsky | 220/86 R |
| 2,100,168 | 11/1937 | Melrath | 285/204 |
| 2,133,852 | 10/1938 | Dillhoefer | 285/204 |
| 2,339,255 | 1/1944 | Dodson | 285/202 X |
| 2,466,076 | 4/1949 | Bentley et al. | 220/86 R |
| 2,798,742 | 7/1957 | Parish, Jr., et al. | 285/204 X |
| 3,358,357 | 12/1967 | DeFann | 285/202 X |
| 3,448,892 | 6/1969 | Thieman | 220/86 R |
| 4,027,910 | 6/1977 | Farelli | 296/1 C |
| 4,122,968 | 10/1978 | Germain | 220/86 R |
| 4,185,844 | 1/1980 | Hubbard et al. | 220/86 R X |
| 4,323,166 | 4/1982 | Maeroff | 220/86 R |
| 4,334,703 | 6/1982 | Arthur et al. | 285/222 |
| 4,379,574 | 4/1983 | Leichtl | 220/86.2 X |
| 4,679,698 | 7/1987 | Thorn et al. | 220/86 R |
| 4,690,293 | 9/1987 | Uranishi et al. | 220/86 R |
| 4,759,459 | 7/1988 | Bailey et al. | 220/86 R |
| 4,915,249 | 4/1990 | Anhegger et al. | 220/86 R |
| 4,955,950 | 9/1990 | Seiichi et al. | 141/46 |
| 4,995,433 | 2/1991 | Biecht et al. | 141/312 |
| 5,042,678 | 8/1991 | Munguia | 220/254 |
| 5,069,260 | 12/1991 | Shea | 141/292 |
| 5,111,858 | 5/1992 | Aittama et al. | 141/312 |

*Primary Examiner*—Steven M. Pollard
*Attorney, Agent, or Firm*—Harness, Dickey & Pierce

[57] ABSTRACT

The present invention relates to filler tubes and, more particularly, to fuel filler tubes and methods of attaching them to automobile fuel tanks. The fuel filler tube of the present invention includes an inlet tube, a retainer member, sealing means and a fuel tank having a downwardly extending diameter portion. The retainer is disposed over the downwardly extending diameter portion and adhered to the tank. The inlet tube is then inserted into the fuel tank aperture until the inlet tubes annular flange engages the fuel tank's annular lip. A crimping tool is then inserted through the axial bore of the inlet tube and a plurality of bearings contained on the crimping tool are forced radially outwardly to thereby crimp the inlet tube and downwardly extending diameter portion together. The retainer member includes a plurality of recessed areas for hosting the expanded inlet tube and tank portions.

2 Claims, 2 Drawing Sheets

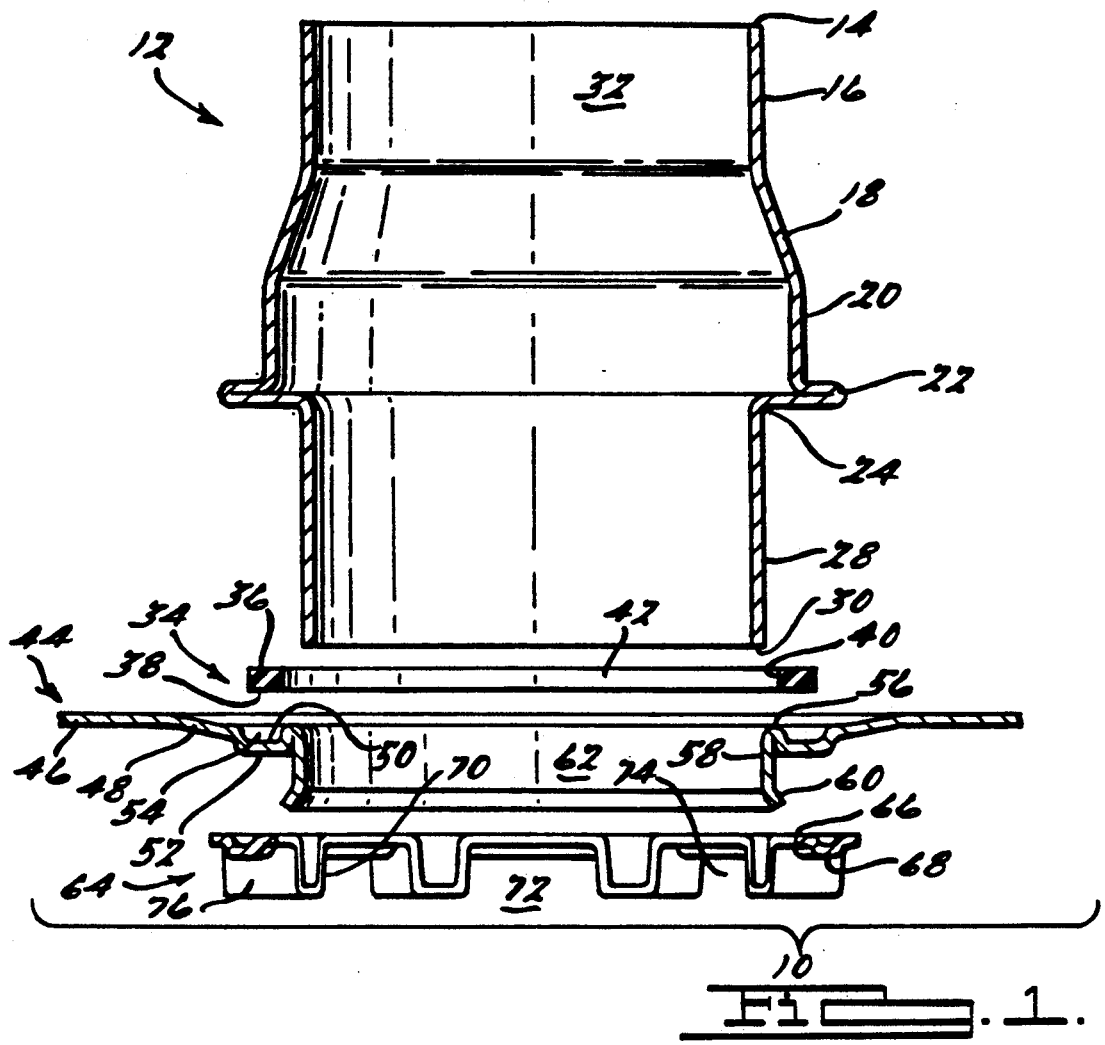
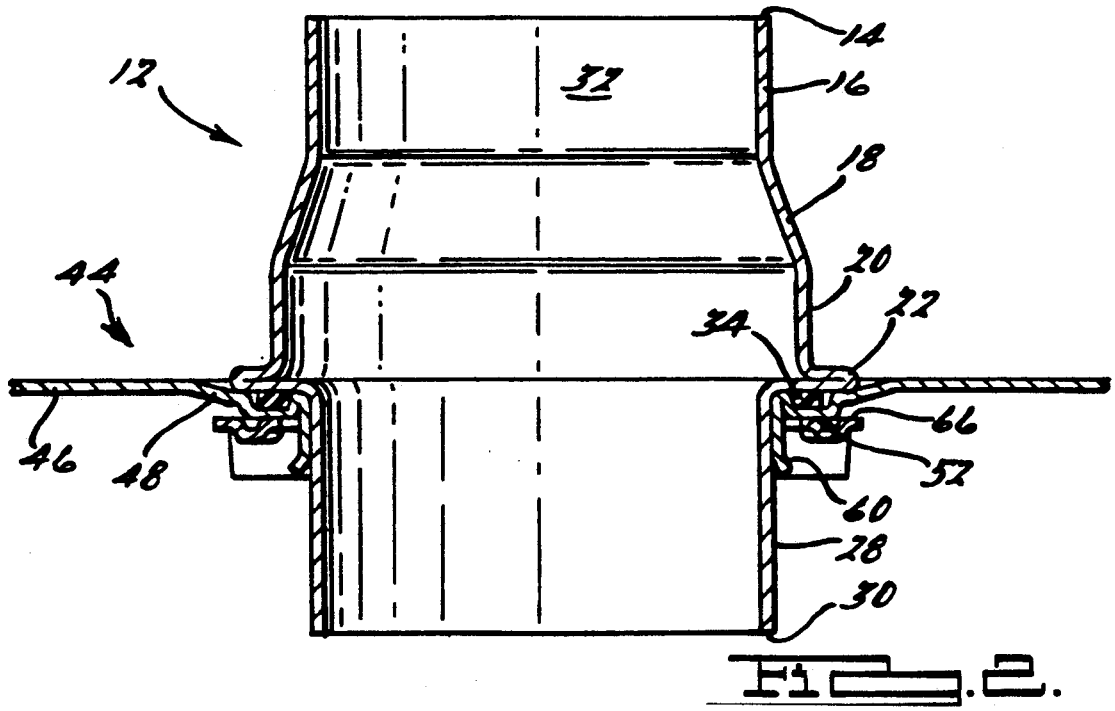

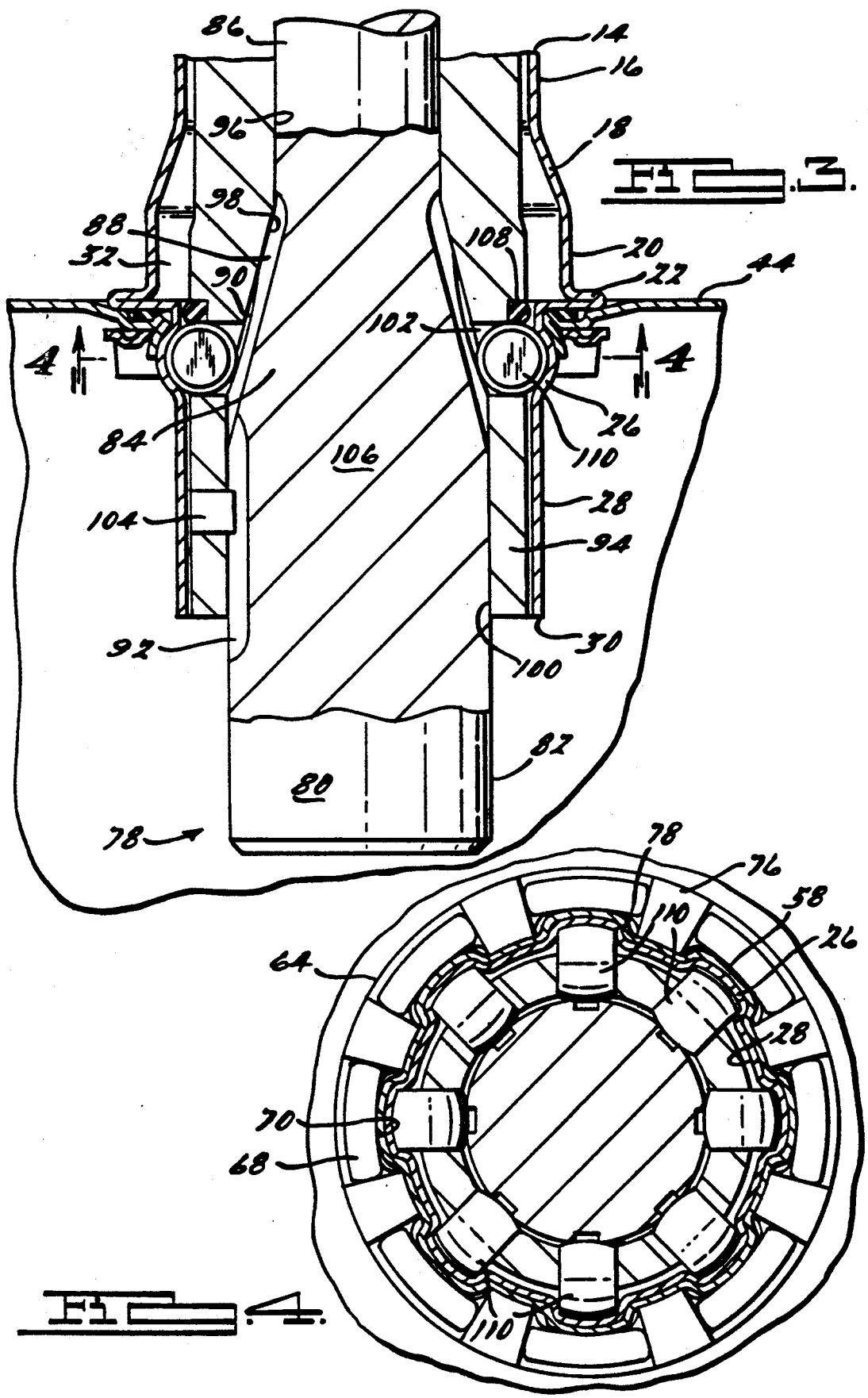

ns,253,773

FILLER TUBE FOR LIQUID CONTAINERS

BACKGROUND OF THE INVENTION

1. Technical Field

The present invention relates to filler tubes for liquid containers and, more particularly, to filler tubes which are attachable to the fuel flange of an automobile fuel tank.

2. Discussion of Related

Fuel filler tubes are tubular conduits which extend from a vehicle's fuel tank and serve as a mechanism for transporting gasoline from the end of the fuel pump hose to the fuel tank. Typically, these fuel filler tubes are permanently attached to the vehicle's fuel tank during the manufacturing process by first cleaning an annular flange provided on the fuel flange and then brazing a metallic fuel filler tube to the fuel flange. This method of attaching fuel filler tubes, however, is unnecessarily time consuming. Further, this method adds to the manufacturing costs of the vehicle.

Recently, there has been an attempt to move away from the standard brazed fuel filler tube assemblies and toward attachable filler tube assemblies which are mechanically coupled to the fuel tank. One disadvantage many of these mechanically attachable fuel filler tube assemblies have is that they require an excessive number of parts to facilitate the connection between the fuel tank and the fuel filler tube. A large number of parts necessarily result in cost disadvantages both in the manufacture and assembly of the fuel filler tubes.

SUMMARY OF THE INVENTION

The present invention relates to a fuel filler tube which includes an inlet tube, a gasket, a bearing set, a retainer member which fits over an annular flange provided on the vehicle's fuel tank and a tool for crimping the inlet tube and the annular flange together. The inlet tube is preferably made of rolled steel tubing and the retainer member is preferably made of hot rolled steel. The gasket can be made from any suitable elastomeric material.

The present invention further relates to the method of attaching the filler tube assembly to the fuel tank. The method involves fitting the leading end of the inlet tube within the fuel tank aperture and expanding the diameter of a section of the inlet tube with a specially designed tool to crimp the inlet tube onto the fuel tank.

Additional objects and advantages of the present invention will become apparent from reading the detailed description of the preferred embodiments which make reference to the following set of drawings in which:

BRIEF DESCRIPTION OF THE DRAWINGS

FIG. 1 is an exploded view of the fuel filler assembly according to the present invention;

FIG. 2 is a cross-sectional view of the initial connection between the inlet tube and the vehicle fuel tank according to the present invention;

FIG. 3 is a partial cross-sectional view illustrating the method of selectively attaching the inlet tube to the vehicle fuel tank according to the present invention; and FIG. 4 is a partial cross-sectional view of the retainer member taken along line 4—4 of FIG. 3 illustrating the expansion of the inlet tube according to the present invention.

DETAILED DESCRIPTION OF THE PREFERRED EMBODIMENT

Referring to FIG. 1, an exploded cross-sectional view of the filler tube assembly 10 of the present invention is shown as comprising an inlet tube 12, a gasket 34, a modified fuel tank 44, and a retainer member 62. The inlet tube 12 is typically formed from rolled steel which is strong, yet selectively deformable and includes a plurality of sections having varying diameters. The trailing end of the inlet tube 12 includes a circumferential edge 14 and a first reduced diameter portion 16. A transitional second diameter portion 18 which extends between the first diameter portion 16 and a third enlarged diameter portion 20 is provided with an increasing diameter in the direction of the third diameter portion 20. The third diameter portion which is provided with the largest diameter is crimped during the manufacturing process to overlap at the trailing end such that an annular flange 22 is formed between the third diameter portion 20 and a fourth reduced diameter portion 28. Axial bore 32 extends the length of the inlet tube 12 to allow for transporting fuel from a conduit (not shown) such as a gasoline pump hose to the fuel tank 44.

Gasket 34 which provides a fluid tight seal between the inlet tube 12 and the tank 44 is typically formed from an elastomeric material which is readily deformable to take on various shapes. One such gasket is the 90 durometer gasket available from Gosher Rubber Company.

The fuel tank 44 is provided with a specially adapted sealing arrangement about the circumference of the inlet aperture 60 for receiving the trailing end 30 of the inlet tube 12. The fuel tank 44 and, more particularly, the sealing arrangement of the fuel tank is made from a selectively deformable metal. The fuel tank includes a body portion 46 for storing fuel and a sealing arrangement including a transitional section 48, an annular recess 50, an annular ridge 52, an upwardly extending lip 56, a downwardly extending diameter portion 58 and an outwardly projecting portion 60 having an enlarged diameter to facilitate connection between the filler tube 12 and the fuel tank 44. A gap 54 is provided within the recess 50 between the extending lip 56 and the transitional section 48 for hosting the gasket 34.

Retainer member 64, as shown more clearly in FIG. 4, assists in securing the inlet tube 12 to the tank 44 and is typically formed by stamping hot rolled gage steel which upon full cooling is highly resistant to the deformation. The retainer member 64 includes a top surface 66, a bottom surface 68 and an inner surface 70 which defines the axial bore 72. The inner surface 70 is provided with a plurality of recesses 74 positioned between the lugs 76 which extend downwardly.

Assembly and operation of the filler tube arrangement will now be described in further detail. Referring to FIG. 2, a partial cross-sectional view illustrating the method of selectively attaching the inlet tube 12 to the fuel tank 44 prior to crimping the two components together is provided. Initially, the retainer member 64 is positioned over the downwardly extending diameter portion 58 of the fuel tank 44 such that the top surface 66 of the retainer engages the annular ridge 52 formed on the bottom surface of the recessed portion 50. Preferably, the retainer member is mechanically fastened to the tank 44. The inner surface 70 of the retainer member 64, as shown more clearly in FIG. 4, projects sufficiently inwardly to become disposed substantially adjacent to the outer diameter of tube portion 28. The retainer member is thereby held in place over tube portion 28 by the outwardly projecting portion 60. Alternatively, the retainer member 64 could be attached to the annular ridge 52 by a metal binding adhesive. After the retainer member 64 has been positioned over the diameter portion 58, the gasket 34 is then placed over the lip 56 and positioned within the gap 54 of recess 50. It will be understood by those skilled in the art that the gasket 34 could be positioned within gap 54 prior to securing the retainer member 64 over the diameter portion 58.

The leading end 30 of the inlet tube is then inserted into the tank aperture 62 until the annular flange 22 of the inlet tube engages the lip 56 at neck 24. The gasket 34 becomes slightly compressed with the top surface 36 engaging the annular flange 22 and the bottom surface 38 engaging the recess 50. The outer surface of the tube diameter portion 28 is contiguously disposed against the inner surface of tank diameter portion 58 to preclude side to side movement of the inlet tube 12 upon insertion of the inlet tube.

Referring to FIGS. 3 and 4, partial cross-sections views illustrating the permanent attachment of the inlet tube 12 to the tank 44 are provided. With the filler tube components in place, a crimping tool 78 is utilized to mechanically secure the inlet tube to the tank. The crimping tool 78 includes a casing 94 having an axial bore 106 therethrough and a mating ram member 80. The axial bore 106 includes a reduced inner diameter portion 96 and a second enlarged inner diameter portion 100 with a frustoconical-shaped inner diameter portion 98 separating the first and second inner diameters. Disposed in axial alignment proximate to the frustoconical-shaped inner diameter are a plurality of a substantially rectangular shaped apertures 102 for hosting bearings 110. The bearings 110 typically have an overall cylindrical shape with slightly rounded edges and are held in an upright position by the apertures 102. The casing 94 is also provided with an elastomeric ring 108 which is disposed axially around the outer diameter of the casing such that the base portion of the bearings 110 engage the elastomeric ring 108 as the bearings are forced radially outwardly. Extending into the second inner diameter portion 100 is a nub 104 which serves to align the ram member 80 within the axial bore 106 of the casing 94.

The ram member 80 includes a first diameter portion 86 and a second enlarged diameter portion 82. Extending between the first and second diameter portions 86 and 82, respectively, is a frustoconical-shaped transitional diameter portion 84. Each of these diameter portions 82, 84 and 86, respectively, are engineered to mate substantially contiguously with the corresponding inner diameter portions of the casing during crimping. Disposed on the outer surface of the mating ram member 80 are a plurality of grooves 88 extending lengthwise along the transitional diameter portion 84 and partially along the first and second diameters. The grooves 88 are provided with rounded edges 90 to facilitate rotation of the bearings. Typically, the number of grooves 88 are equal to the number of bearings 110. In a preferred embodiment, a total of eight bearings and eight grooves are utilized. One of the grooves 92 typically extends substantially along the length of the second diameter portion to engage nub 104 and properly align the ram member 80 within the axial bore 106 of the casing 94. It will be understood that more than one of the grooves could be extended along the length of the second diameter portion for use in aligning the ram member within the axial bore of the casing.

To crimp the inlet tube 12 to the tank 44, the crimping tool 78 is inserted into the axial bore 32 of the inlet tube 12 through leading end 14. Initially, the ram member 80 partially extends beyond the trailing end 112 of the casing 94 to provide a space between the ram member 80 and the frustoconical diameter portion 98 which allows the bearings 110 to retract within the casing 94 upon insertion into the axial bore 32. The casing is aligned such that the bearings 110 are in axial alignment with the recessed areas 74 contained on retainer member 64. Once the casing 94 is properly aligned, the ram member 80 is drawn in the direction of the leading end of the inlet tube within the axial bore 106 of casing 94 such that the frustoconical diameter portion 98 increasingly engages the bearings 110. This in turn forces the bearings to rotate clockwise and move radially outwardly causing the tube portion 28 to bulge radially outwardly to form projections 26. As the bearings 110 are rotated and forced radially outwardly, the bearings 110 grab the inlet tube drawing the inlet tube tightly against the tank 44. In response, the extending portion 58 of tank 44 expands contiguously about projecting portions 26 to overlap the recesses occurring between the lugs 76, thus permanently attaching the inlet tube 12 to the tank 44.

Once the crimping step has been carried out the ram member 80 is driven in a direction away from the leading end of the inlet tube within the axial bore 106 of the casing 94 to allow for retraction of the bearings 110 and withdrawal of the crimping tool from the axial bore 32 of the inlet tube 12.

It will be understood by those skilled in the art that the ram member 80 can be drawn and driven within the axial bore 106 of casing 94 by any means suitable to provide the force necessary to cause crimping. Typically, the stroke of the ram member is controlled by a mechanical device extending from the reduced diameter portion 86 of ram member 80 which is operated under a limited range of stroke.

While the above description constitutes the preferred embodiments of the present invention, it is to be appreciated that the invention is susceptible to modification, variation and change without departing from the proper scope and fair meaning of the accompanying claims. For example, it should be apparent to those skilled in the art that sealing means other than the gasket previously described herein could be utilized. Commercially available liquid sealers which harden over a relatively short period of time could be utilized.

We claim:
1. A tube assembly, comprising:
 a filler tube having a first diameter portion, a second diameter portion extending from said first diameter portion, said second diameter portion having an increasing diameter from said first end to a second end, a third diameter portion, a fourth diameter portion having a plurality of outward projections and an outwardly projecting annular flange disposed between said third and fourth diameter portions;
 a tank for receiving said filler tube, said tank including a body and a sealing arrangement, said sealing arrangement including a downwardly tapering section, an annular recess which forms a gap, an upwardly projecting annular lip and a downwardly extending diameter portion having a plurality of outward projections which overlap said outward projections of said tube;

sealing means disposed between said filler tube and said tank; and a retainer member disposed over said downwardly extending diameter portion, said retainer member having a plurality of recessed areas wherein the outward projections of said tank overlap said recessed areas to lock said filler tube to said tank.

2. A method of attaching a tube assembly to a tank having a downwardly extending diameter portion, said method comprising the steps of:

a) positioning and adhering a retainer member having a plurality of spaced apart lugs and recesses over the downwardly extending diameter of said tank;

b) partially inserting an inlet tube having an axial bore therethrough into said tank such that the outside diameter of said inlet tube is substantially contiguous with the inside diameter of said downwardly extending diameter portion;

c) inserting a crimping tool having radially outwardly expandable bearings into the axial bore of said inlet tube;

d) expanding said bearings to thereby crimp said inlet tube and said tank together; thereby producing overlapping outward projections in the inlet tube and tank, said projections extending into said retainer recesses and e) removing said crimping tool from said axial bore.

* * * * *